(12) United States Patent
Kuwahara et al.

(10) Patent No.: US 10,093,300 B2
(45) Date of Patent: Oct. 9, 2018

(54) VEHICLE CONTROL SYSTEM

(71) Applicant: TOYOTA JIDOSHA KABUSHIKI KAISHA, Toyota-shi (JP)

(72) Inventors: Seiji Kuwahara, Susono (JP); Kazumi Hoshiya, Gotemba (JP); Norimi Asahara, Numazu (JP); Yoshio Ito, Susono (JP); Takahito Endo, Nagaizumi-cho (JP); Tadashi Fujiyoshi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 127 days.

(21) Appl. No.: 15/092,116

(22) Filed: Apr. 6, 2016

(65) Prior Publication Data

US 2016/0318514 A1    Nov. 3, 2016

(30) Foreign Application Priority Data

Apr. 30, 2015 (JP) .................................. 2015-092832

(51) Int. Cl.
*B60W 30/18* (2012.01)
*B60W 10/06* (2006.01)
*B60W 10/184* (2012.01)

(52) U.S. Cl.
CPC .......... *B60W 10/06* (2013.01); *B60W 10/184* (2013.01); *B60W 30/18136* (2013.01); *B60W 2030/18081* (2013.01); *B60W 2710/0655* (2013.01)

(58) Field of Classification Search
CPC ..................................................... B60W 10/06
See application file for complete search history.

(56) References Cited

U.S. PATENT DOCUMENTS

| | | | |
|---|---|---|---|
| 6,459,980 B1 * | 10/2002 | Tabata | B60K 6/46 180/65.1 |
| 9,327,732 B1 * | 5/2016 | Miller | B60W 30/18136 |
| 2012/0253645 A1 | 10/2012 | Hashimoto | |
| 2013/0110343 A1 | 5/2013 | Ichikawa et al. | |

FOREIGN PATENT DOCUMENTS

| | | |
|---|---|---|
| JP | 60-69245 A | 4/1985 |
| JP | 60-233349 A | 11/1985 |
| JP | 2011-122553 A | 6/2011 |
| WO | WO 2011/158347 A1 | 12/2011 |

\* cited by examiner

*Primary Examiner* — Adam D Tissot
*Assistant Examiner* — Michael A Berns
(74) *Attorney, Agent, or Firm* — Oblon, McClelland, Maier & Neustadt, L.L.P.

(57) ABSTRACT

A vehicle control system to reduce shocks under an autonomous mode is provided. The vehicle control system is configured to select an operating mode of a vehicle from a manual mode in which a driving force and a braking force are controlled manually by a driver, and an autonomous mode in which the driving force and the braking force are controlled autonomously. A controller is configured to execute a fuel cut-off control, and a threshold selected under the autonomous mode is set in such a manner as to terminate the fuel cut-off control earlier than under the manual mode.

5 Claims, 5 Drawing Sheets

VEHICLE CONTROL SYSTEM

CROSS REFERENCE TO RELATED APPLICATIONS

The present invention claims the benefit of priority to Japanese Patent Application No. 2015-092832 filed on Apr. 30, 2015 with the Japanese Patent Office, the entire contents of which are incorporated herein by reference in its entirety.

BACKGROUND

Field of the Invention

Embodiments of the present invention relates to the art of a vehicle control system configured to allow a vehicle to operate autonomously without requiring a driver to operate an accelerator and a brake, and especially to a vehicle control system configured to switch an operating mode of the vehicle between manual mode and autonomous mode.

Discussion of the Related Art

US2013/110343 A1 describes a driving assistance device configured to switch an operating mode of a vehicle between manual mode in which driving force and braking force are controlled manually by a driver and automated driving mode in which driving force and braking force are controlled autonomously, in response to a manual switching operation executed by the driver.

In the vehicle in which the operating mode can be switched between the autonomous mode and the manual mode, the driving force and the braking force are changed irrespective of the driver's intension under the autonomous mode, and resultant change in the vehicle behavior may be sensed by the driver.

SUMMARY

Aspects of embodiments of the present application have been conceived noting the foregoing technical problems, and it is therefore an object of the present application is to provide a vehicle control system configured to reduce unintentional shocks during propulsion under the autonomous mode.

The present invention relates to a vehicle control system that is configured to select an operating mode of a vehicle from a manual mode in which a driving force and a braking force are controlled manually by a driver, and an autonomous mode in which the driving force and the braking force are controlled autonomously. In order to achieve the above-explained objective, according to the preferred embodiment, the vehicle control system is provided with a threshold for determining an execution of a fuel cut-off control to stop a fuel supply to an engine while establishing an engine braking force, and a controller that executes the fuel cut-off control. Specifically, the threshold selected under the autonomous mode is set in such a manner as to terminate the fuel cut-off control earlier than under the manual mode.

In a non-limiting embodiment, the threshold includes at least any one of threshold values of a vehicle speed and an engine speed, and the controller is configured to set the threshold to be selected under the autonomous mode to a higher value than that of the threshold to be selected under the manual mode.

In a non-limiting embodiment, the vehicle further comprises a geared transmission connected to the engine. In addition, the threshold includes a gear stage of the geared transmission, and the controller is further configured to set the threshold to be selected under the autonomous mode to the higher gear stage than that of the threshold to be selected under the manual mode.

In a non-limiting embodiment, the vehicle further comprises a transmission connected to the engine. In addition, the threshold includes a speed ratio of the transmission, and the controller is further configured to set the threshold to be selected under the autonomous mode to the smaller ratio than that of the threshold to be selected under the manual mode.

Thus, according to the preferred embodiment of the present application, the threshold selected under the autonomous mode is set in such a manner as to terminate the fuel cut-off control earlier than under the manual mode. According to the preferred embodiment, therefore, shocks resulting from terminating the fuel cut-off control and shocks caused during execution of the fuel cut-off control can be reduced under the autonomous mode.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 5:
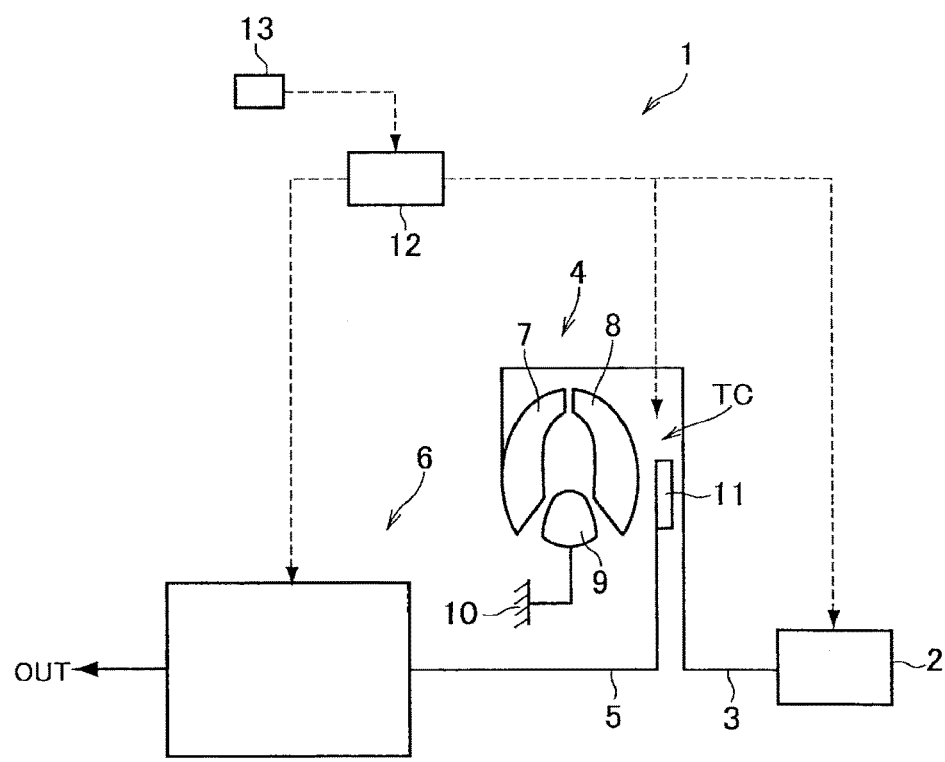
FIG. 5 is a schematic illustration showing the vehicle to which the control system according to the preferred embodiment is applied.

Preferred embodiments of the present application will now be explained with reference to the accompanying drawings. Referring now to FIG. 5, there is shown an example of a vehicle 1 to which the control system according to the preferred embodiment is applied. As illustrated in FIG. 5, the vehicle 1 comprises an engine 2, a torque converter 4 connected to an output shaft 3 of the engine 2, and a transmission 6 connected to an output shaft (or a turbine shaft) 5 of the torque converter 4. In order to deliver output torque of the engine 2 to the transmission 6 without multiplying, a torque converter clutch TC is arranged parallel to the torque converter 4.

The torque converter 4 comprises a pump impeller 7 connected to the engine 2, a turbine runner 8 being opposed to the pump impeller 7, and a stator 9 interposed between the pump impeller 7 and the turbine runner 8. When the pump impeller 7 is rotated, a spiral flow of working fluid is created in a housing of the torque converter 4, and a flowing direction of the spiral flow toward the turbine runner 8 is adjusted by the stator 9. To this end, the stator 9 is connected to a stationary member 10 such as a casing through a one-way clutch (not shown) that is brought into engagement mode within a converter range where the pump impeller 7 is rotated at a speed higher than that of the turbine runner 8 connected to the turbine shaft 5.

A torque transmission efficiency of the torque converter 4 is degraded inevitably by the working fluid. Specifically, when a rotational speed of the turbine runner 8 exceeds a rotational speed of the pump impeller 7, a load of the working fluid is applied to the turbine runner 8 in a direction to block rotation of the turbine runner 8. In order to avoid such disadvantage, the torque converter clutch TC is arranged in such a manner as to rotate the turbine shaft 5 integrally with the engine 2. Specifically, the torque converter clutch TC is a disc member in which a friction plate 11 is attached to a face opposed to a front cover of a housing holding the torque converter 4, and the engine 2 is connected to the turbine shaft 5 by bringing the friction plate 11 into contact to the front cover. A torque transmitting capacity of the torque converter clutch TC is governed by a difference in hydraulic pressure applied to each face of the torque converter clutch TC.

The transmission 6 includes not only a geared transmission in which a speed ratio is changed stepwise but also a continuously variable transmission in which a speed ratio is changed continuously.

An operating mode of the vehicle 1 can be selected from a manual mode in which a driving force, a braking force, a steering angle etc. are changed manually in response to an operation by the driver, and an autonomous mode in which the vehicle 1 is operated autonomously. In order to integrally control the engine 2, the transmission 6 and so on depending on the selected operating mode, the vehicle 1 is provided with an electronic control unit (to be abbreviated as the "ECU" hereinafter) 12 as a controller. To this end, detection signals and information from sensors 13 including on-board units are sent to the ECU 12. Although only one ECU 12 is depicted in FIG. 5, a plurality of ECUs 12 may be arranged in the vehicle 1 to control the above-mentioned devices individually.

Specifically, the sensor 13 includes an accelerator sensor for detecting an opening degree of an accelerator, a brake sensor for detecting a depression of a brake pedal, a steering sensor for detecting a steering angle of the steering device, an engine speed sensor for detecting a speed of the engine 2, a turbine speed sensor for detecting a speed of the turbine shaft 5, an output speed sensor for detecting a speed of an output shaft of the transmission 6, a vehicle speed sensor for detecting a wheel speed of the vehicle 1, a longitudinal acceleration sensor for detecting a longitudinal acceleration of the vehicle 1, a lateral acceleration sensor for detecting a lateral acceleration of the vehicle 1, a yaw rate sensor for detecting a yaw rate of the vehicle 1 and so on.

The sensor 13 further includes the following external sensors for detecting an external condition, such as an on-board camera, a RADAR (i.e., a radio detection and ranging) a LIDAR (i.e., a laser imaging detection and ranging) and so on. In addition, the on-board unit includes a switch for selecting the operating mode manually by the driver.

Specifically, the on-board camera is arranged inside of a windshield glass, and transmits recorded information about the external condition to the ECU 12. To this end, not only a monocular camera but also a stereo camera having a plurality of lenses and image sensors to achieve a binocular vision may be used as the on-board camera. If the stereo camera is used as the on-board camera, the ECU 12 is allowed to obtain three-dimensional information in the forward direction.

The RADAR is adapted to detect obstacles utilizing radio waves such as millimetric-waves and microwaves, and to transmit detected information to the ECU 12. Specifically, the RADAR detects an obstacle such as other vehicle and so on by emitting radio waves and analyzing the radio waves reflected from the obstacle.

Likewise, the LIDAR is adapted to detect obstacles utilizing laser light and to transmit detected information to the ECU 12. Specifically, the LIDAR detects an obstacle such as other vehicle and so on by emitting laser light and analyzing the laser light reflected from the obstacle.

In addition, the vehicle 1 is further provided with a GPS (i.e., global positioning system) receiver, a digital map database, and a navigation system. Specifically, the GPS receiver is adapted to obtain a position (i.e., latitude and longitude) based on incident signals from GPS satellites, and to transmit the positional information to the ECU 12. The digital map database may be installed in the ECU 12, but map information stored in external online information processing systems may also be available. The navigation system is configured to determine a travelling route of the vehicle 1 based on the positional information obtained by the GPS receiver and the map database.

The ECU 12 carries out calculations based on the incident data or information from the sensor 13 and preinstalled data, and calculation results are sent in the form of command signal to the engine 2, the brake, the transmission 6, and actuators of the steering device and the torque converter clutch TC and so on.

In order to operate the vehicle 1 autonomously, the vehicle 1 is provided with a throttle actuator, a brake actuator, a steering actuator and so on. Specifically, the throttle actuator is adapted to change an opening degree of the throttle valve in response to reception of the command signal. The brake actuator is adapted to actuate the brake device to control braking force applied to the wheels in response to reception of the command signal. The steering actuator is adapted to activate an assist motor of the steering device to control a steering torque in response to reception of the command signal.

The ECU 12 comprises a position recognizer, an external condition recognizer, a running condition recognizer, a travel plan creator, and a travel controller.

Specifically, the position recognizer is configured to recognize a current position of the vehicle 1 on the map based on the positional information received by the GPS receiver and the map database. The current position of the vehicle 1 may also be obtained from the positional information used in the navigation system. Optionally, the vehicle 1 may also be adapted to communicate with external sensors arranged along the road to obtain the current position of the vehicle 1.

The external condition recognizer is configured to recognize external conditions of the vehicle 1 such as a location of a traffic lane, a road width, a road configuration, a road gradient, an existence of obstacles around the vehicle 1 and so on, based on the recorded information of the on-board camera, or detection data of the RADAR or the LIDAR. Optionally, weather information, a friction coefficient of road surface etc. may be obtained according to need.

The running condition recognizer is configured to recognize running condition of the vehicle 1 such as a vehicle speed, a longitudinal acceleration, a lateral acceleration, a yaw rate and so on based on detection result of the internal sensors.

The travel plan creator is configured to create a travel locus of the vehicle 1 based on a target course determined by the navigation system, a position of the vehicle 1 recognized by the position recognizer, and an external condition recognized by the external condition recognizer. That is, the travel plan creator creates a travel locus of the vehicle 1 within the target course in such a manner that the vehicle 1 is allowed to travel safely and properly while complying with traffic rules.

In addition, the travel plan creator is further configured to create a travel plan in line with the created travel locus. The travel plan creator creates a travel plan in line with the target course based on the recognized external conditions and the map database.

Specifically, the travel plan is created based on prospective data after few seconds from the present moment to determine a future condition of the vehicle 1 such as a driving force or the like required in future. Optionally, the travel plan may also be created based on prospective data after several ten seconds depending on the external conditions and the running conditions. Thus, the travel plan creator creates a future plan to change a vehicle speed, acceleration, steering torque etc. during travelling along the target course in the form of e.g., a map.

Alternatively, the travel plan creator may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller is configured to operate the vehicle 1 autonomously by controlling a driving force, a braking force, a steering angle etc. in line with the travel plan created by the travel plan creator. To this end, specifically, the travel controller transmits command signals to the throttle actuator, the brake actuator, the steering actuator, the shifting actuator and so on in accordance with the travel plan.

By contrast, under the manual mode, the ECU 12 controls the above-mentioned actuators in response to manual operations of the accelerator, the brake, the steering device etc. executed by the driver.

The ECU 12 is further configured to carry out a fuel cut-off control to save fuel while establishing an engine braking force. Specifically, under the autonomous mode, the ECU 12 executes the fuel cut-off control based on the braking force determined in line with the travel plan. By contrast, under the manual mode, the ECU 12 executes the fuel cut-off control upon reduction in an operating amount of the accelerator to be smaller than a predetermined amount. Here, in any of the operating modes, a braking force is applied to each wheel by the brake device in addition to the engine braking force. In addition, the torque converter clutch TC is brought into engagement during execution of the fuel cut-off control.

A magnitude of the engine braking force established by the fuel cut-off control is governed by an engine speed and hence control margin thereof is rather small. For this reason, a driving force may be changed significantly when a speed ratio is changed during execution of the fuel cut-off control or when the fuel cut-off control is terminated. In addition, since the engine 2 is rotated passively during establishing the engine braking force, a direction of torque applied to a gear of the transmission 6 or the like may be reversed when the fuel cut-off control is terminated and hence the engine 2 is started.

Consequently, shocks may be caused by the above-explained change in the driving force and torque reverse of the gears. Nonetheless, since the fuel cut-off control is executed in response to the operation by the driver under the manual mode, the driver may accept the shocks resulting from the fuel cut-off control. However, under the autonomous mode, the fuel cut-off control is executed irrespective of the driver's intension and hence the shocks may be caused unintentionally. That is, the shocks resulting from the fuel cut-off control may be accepted by the driver under the manual mode, but not accepted by the driver under the autonomous mode.

Figure 1:
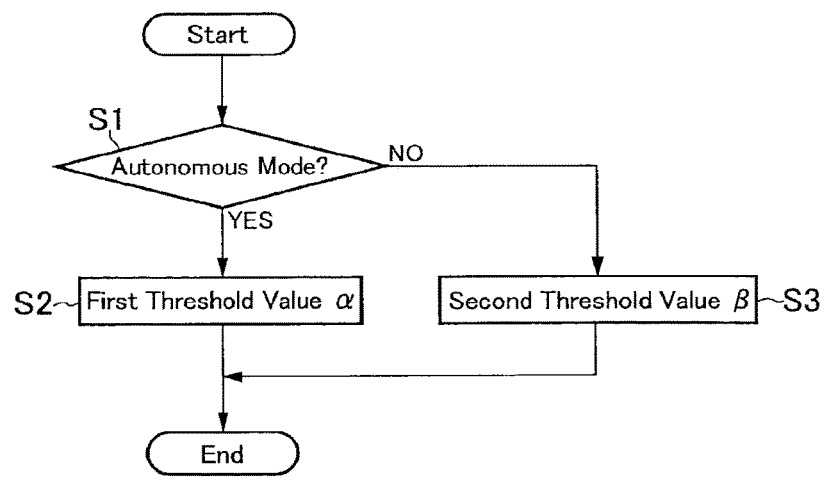
FIG. 1 is a flowchart showing a control example carried out by the control system.

In order to avoid such disadvantage, the vehicle control system is configured to limit an execution range of the fuel cut-off control under the autonomous mode. To this end, the vehicle control system according to the preferred embodiment differentiate the execution range of the fuel cut-off control depending on the selected operating mode as shown in FIG. 1, and the routine shown in FIG. 1 is repeated at a predetermined interval. First of all, it is determined at step S1 whether or not the autonomous mode is currently selected. Such determination at step S2 can be made based on a signal from the switch for selecting the operating mode, or by determining whether or not a flag representing the autonomous mode is erected under the control currently executed.

If the autonomous mode is currently selected so that the answer of step S1 is YES, a lower limit value of the vehicle speed as a criterion for executing the fuel cut-off control is set to a first threshold value $\alpha$ at step S2, and the routine is terminated. The first threshold value $\alpha$ is determined based on a result of experimentation or simulation in such a manner that the change in the driving force caused when the fuel cut-off control is terminated and the engine 2 starts generating a torque falls within an acceptable range. In other words, the first threshold value $\alpha$ is determined in such a manner that the shock resulting from terminating the fuel cut-off control earlier will not be sensed by the driver. Specifically, the first threshold value $\alpha$ is set to a speed higher than a speed to which a below-mentioned second threshold value $\beta$ is set.

By contrast, if the manual mode is currently selected so that the answer of step S1 is NO, the lower limit value of the vehicle speed to execute the fuel cut-off control is set to a second threshold value $\beta$ at step S3, and the routine is terminated. As known in the conventional art, the second threshold value $\beta$ is determined based on an engine speed at which an engine stall will not be caused even if an abrupt braking is applied and a maximum speed ratio of the transmission 6.

Figure 2:
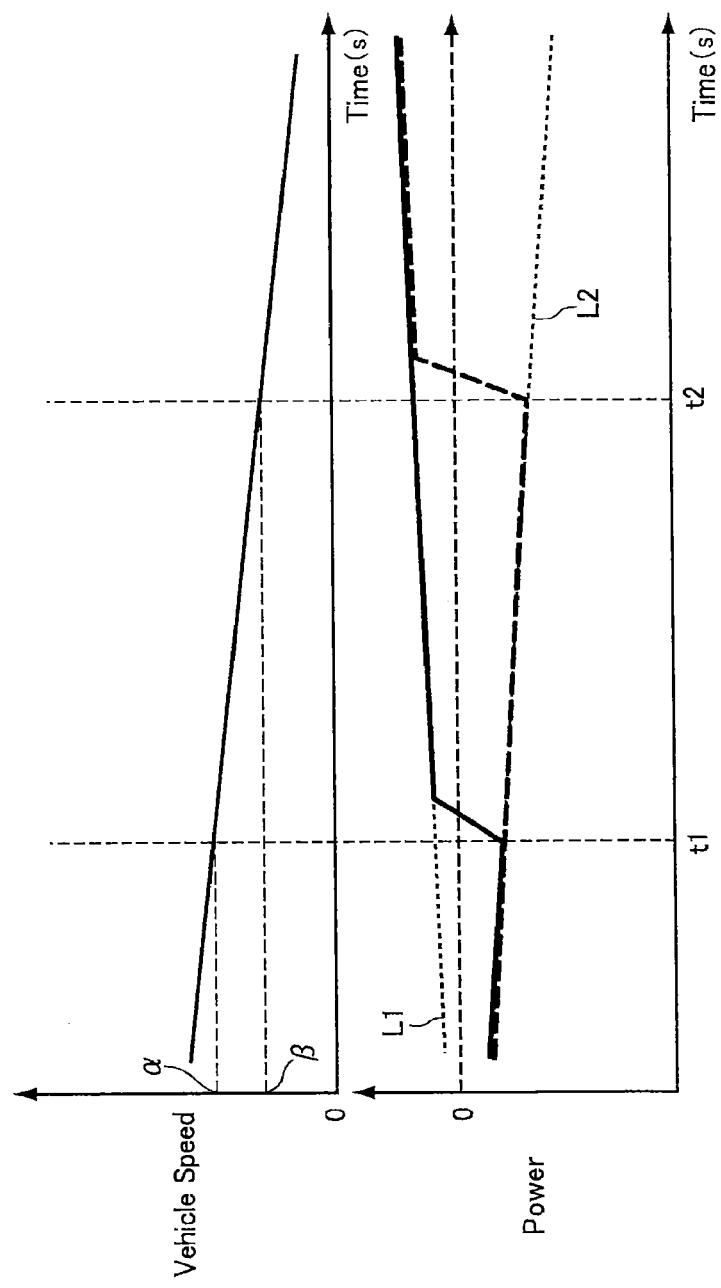
FIG. 2 is a time chart showing temporal change in power during execution of the fuel-cut control.

Turning to FIG. 2, temporal change in a power applied to a not shown driveshaft under each operating mode. In FIG. 2, the solid line represents the temporal change in the power under the autonomous mode, the dashed line represents the temporal change in the power under the manual mode, the first dotted line L1 represents the temporal change in the power under a condition that the fuel cut-off control is not executed, and the second dotted line L2 represents the change in the power during execution of the fuel cut-off control. In the example shown in FIG. 2, specifically, a continuously variable transmission is used as the transmission 6, and a speed ratio thereof is changed in such a manner to maintain the engine speed to a constant speed. Given that the engine speed is maintained to a constant speed, a braking torque generated by the engine 2 is also maintained substantially constant. Meanwhile, the speed ratio of the transmission 6 is gradually increased with a reduction in the vehicle speed to maintain the engine speed to a constant speed. Consequently, a braking force is increased gradually with a reduction in the vehicle speed during execution of the fuel cut-off control.

Before point t1, the vehicle speed is still higher than the first threshold value α, and the fuel cut-off control is executed irrespective of the selected operating mode. In this situation, a braking force governed by the engine speed and the current speed ratio is applied to the driveshaft.

When the vehicle speed is lowered to the first threshold value α at point t1, the fuel cut-off control is terminated if the autonomous mode is selected. In this situation, the fuel is supplied to the engine 2 in an amount possible to start the engine 2, and when a complete combustion of the engine 2 is achieved, the driveshaft is subjected to the driving force derived from a creep torque. Consequently, the engine braking force is no longer applied to the driving wheels, and a braking force is applied to the driving wheels by controlling the brake actuator according to need. By contrast, if the manual mode is selected in this situation, the fuel cut-off control is continued.

Then, the vehicle speed is further reduced to the second threshold value β at point t2, the fuel cut-off control is terminated if the manual mode is selected. In this situation, the fuel is supplied to the engine 2 in an amount possible to start the engine 2, and hence the driveshaft is subjected to the driving force derived from a creep torque. In this case, the fuel cut-off control is terminated at a speed lower than the speed at which the fuel cut-off control is terminated under the autonomous mode. That is, when the fuel cut-off control is terminated under the manual mode, the speed ratio of the transmission 6 is larger than that of the case in which the fuel cut-off control is terminated under the autonomous mode. Consequently, the braking force established at the termination of the fuel cut-off control under the manual mode is increased to be larger than that established at the termination of the fuel cut-off control under the autonomous mode. For this reason, the driving force is changed more significantly when terminating the fuel cut-off control under the manual mode, in comparison with the case of terminating the fuel cut-off control under the autonomous mode.

Thus, change in the driving force resulting from terminating the fuel cut-off control can be suppressed by terminating the fuel cut-off control earlier at a high speed. Consequently, shocks resulting from terminating the fuel cut-off control can be reduced.

As described, during execution of the fuel cut-off control, the speed ratio of the transmission 6 is changed in accordance with the engine speed to prevent a reduction in the engine speed. That is, the fuel cut-off control may also be executed depending on the speed ratio of the transmission 6, and if the transmission 6 is a geared transmission, the fuel cut-off control may be executed depending on a gear stage of the transmission 6. In this case, in the routine shown in FIG. 1, a third threshold value γ of the speed ratio is set, at step S2, and a fourth threshold value δ of the speed ratio that is larger than the third threshold value γ is set at step S3. If the transmission 6 is a geared transmission, the gear stage of the transmission 6 is used as the threshold value to determine an execution of the fuel cut-off control. In case of thus determining an execution of the fuel cut-off control based on the speed ratio, the third threshold value γ under the autonomous mode is set to be smaller than the fourth threshold value δ under the manual mode so as to terminate the fuel cut-off control under the autonomous mode while keeping the speed ratio to a small ratio.

Since the speed ratio to execute the fuel cut-off control under the autonomous mode is smaller than that to execute the fuel cut-off control under the manual mode, the fuel cut-off control is terminated earlier during deceleration under the autonomous mode. For this reason, change in power resulting from terminating the fuel cut-off control can be suppressed to reduce unintentional shocks.

In addition, the driver may become more tolerant of shocks under a condition that the engine 2 is operated at a relatively high speed, for example, during coasting of the vehicle after accelerating the vehicle abruptly, in comparison with a case in which the vehicle is propelled at a substantially constant speed. Therefore, under the autonomous mode, the fuel cut-off control may also be executed when the engine speed is high. In this case, the threshold value of the engine speed to execute the fuel cut-off control under the autonomous mode may be increased to be higher than that to execute the fuel cut-off control under the manual mode. Specifically, in the routine shown in FIG. 1, a fifth threshold value ε of the engine speed as a conventional threshold value to execute the fuel cut-off control is set at step S3, and a sixth threshold value ζ of the engine speed that is larger than the fifth threshold value ε is set at step S2.

Figure 3:
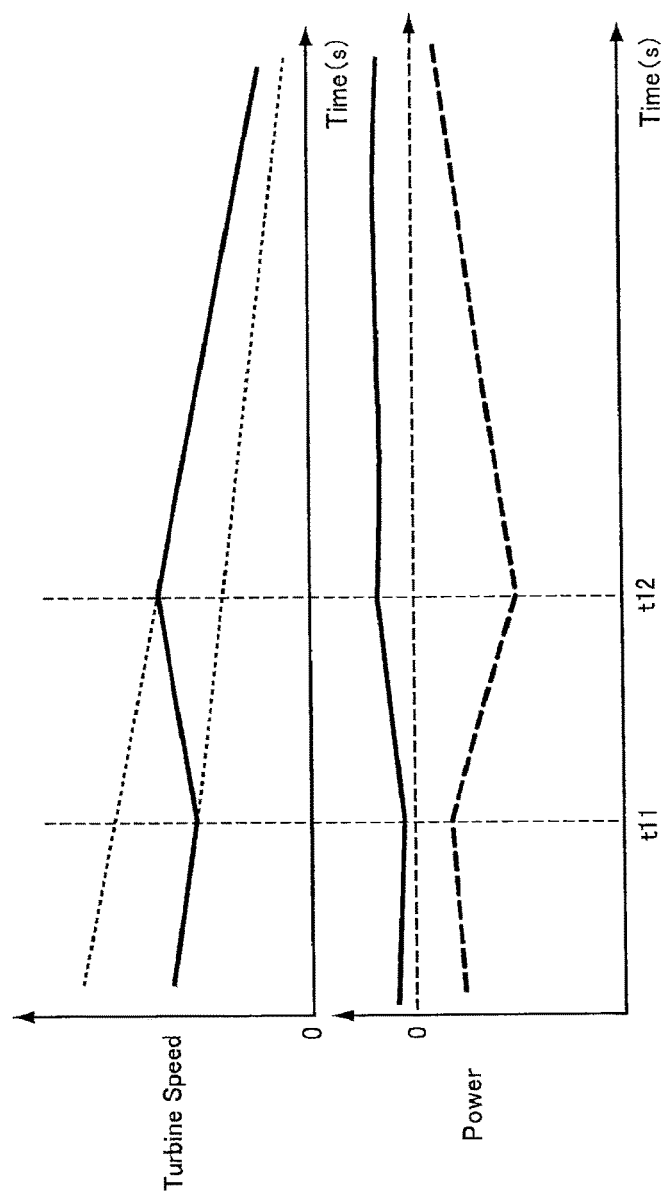
FIG. 3 is a time chart showing temporal change in power during execution of the coast downshifting.

In this case, since the lower limit value of the engine speed to execute the fuel cut-off control under the autonomous mode is thus set to a high speed, the fuel cut-off control may be prevented from being executed easily and may also be terminated earlier during coasting under the autonomous mode. For this reason, shocks resulting from an execution of downshifting during execution of the fuel cut-off control can be suppressed. A temporal change in the power applied to the driveshaft during coast downshifting is shown in FIG. 3. In FIG. 3, the solid line represents the temporal change in the power under the autonomous mode without executing the fuel cut-off control, and the dashed line represents the temporal change in the power during execution of the fuel cut-off control under the manual mode. As described, since the torque converter clutch TC is brought into engagement during execution of the fuel cut-off control, the engine 2 and the turbine shaft 5 are rotated at a substantially same speed. In FIG. 3, therefore, the engine speed is indicated as the turbine speed.

In the example shown in FIG. 3, in case the autonomous mode is selected and the fuel cut-off control is not executed, the driving force derived from the creep torque is applied to the driveshaft before point t11. Specifically, the driving force applied to the driveshaft is reduced with a reduction in the turbine speed. In this situation, the brake actuator is controlled in such a manner as to achieve a required braking force. When the downshifting is carried out at point t11 to increase the speed ratio with a reduction in the turbine speed, the driving force is increased with an increase in the speed ratio, and when the downshifting is completed at point t12, the driving force is maintained to a constant level.

By contrast, in case manual mode is selected and the fuel cut-off control is executed, the braking force is applied to the driveshaft in accordance with the turbine speed. When the downshifting is carried out at point t11 with a reduction in the turbine speed, the braking force applied to the drive shaft is increased with an increase in the turbine sped. Then, when the downshifting is completed at point t12, the braking force is reduced with a reduction in the turbine speed.

In this case, the lower limit value of the engine speed to execute the fuel cut-off control is thus set to the comparatively high speed to prevent an execution of the fuel cut-off control under the autonomous mode during steady running. Therefore, the downshifting will not be executed simultaneously with the fuel cut-off control during coasting to reduce the shocks resulting from change in the braking force caused by the downshifting.

In addition, since the fuel cut-off control is terminated earlier at a higher speed or with a smaller speed ratio in comparison with that under the manual mode, a direction of torque applied to a gear of the transmission 6 will not be reversed when the vehicle 1 is accelerated again. That is, the stopping engine 2 can be prevented from being driven to avoid an abrupt rise in the driving force after the termination of the fuel cut-off control.

Figure 4:
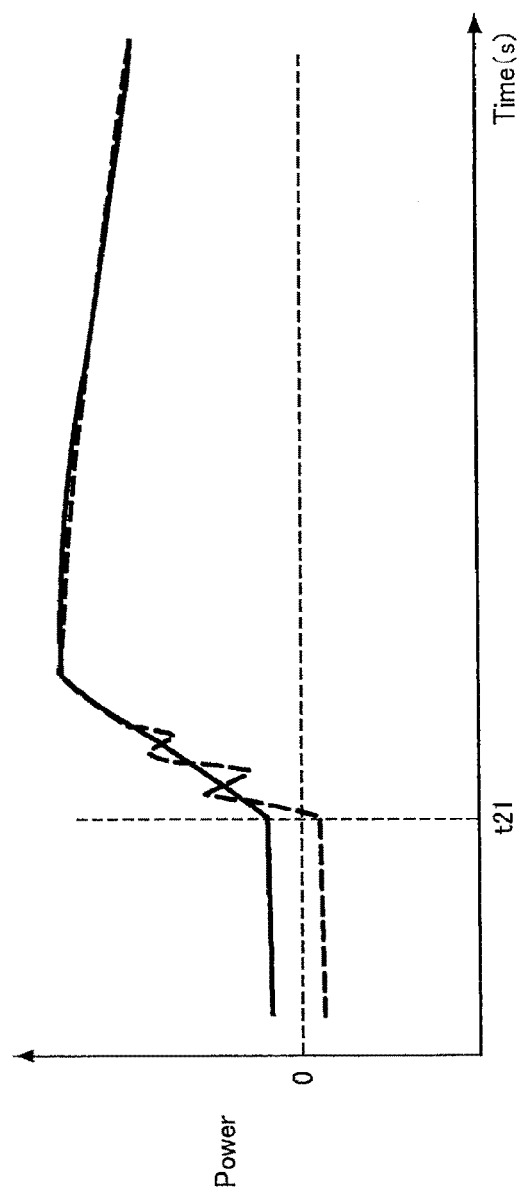
FIG. 4 is a time chart showing temporal change in power during the vehicle.

Turning to FIG. 4, there is shown a temporal change in the power applied to the driveshaft when reaccelerating the vehicle 1. In FIG. 4, the solid line represents the temporal change in the power under the autonomous mode without executing the fuel cut-off control, and the dashed line represents the temporal change in the power during execution of the fuel cut-off control under the manual mode.

In the example shown in FIG. 4, the driving force derived from the creep torque is applied to the driveshaft under the autonomous mode before point t21. When the vehicle 1 is accelerated at point t21, the driving force is increased proportionally.

By contrast, under the manual mode, the fuel cut-off control is being executed before point t21 and hence an engine braking force is applied to the driveshaft. In this case, when the vehicle 1 is accelerated at point t21, a direction of the torque applied to the driveshaft is reversed so that the driving force is applied to the driveshaft. However, as a result of starting the engine 2 being stopped during execution of the fuel cut-off control, a direction of torque applied to the gear of the transmission 6 interposed between the engine 2 and the driveshaft is reversed and hence the driving force drops temporarily when a meshing direction of the gear is reversed. That is, a hunting of the driving force is caused.

Thus, the hunting of the driving force resulting from accelerating the vehicle during execution of the fuel-cut off control under the autonomous mode can be prevented by thus increasing the inhibition range of the fuel cut-off control. In this case, therefore, the shocks caused by the hunting of the driving force can be reduced. Here, such change in the driving force is relatively small at a high speed or with a small speed ratio. In this case, shocks can be reduced even if the vehicle is accelerated during execution of the fuel cut-off control by thus setting the speed to execute the fuel cut-off control under the autonomous mode to the higher speed, or setting the speed ratio to execute the fuel cut-off control under the autonomous mode to the smaller ratio.

Although the above exemplary embodiments of the present application have been described, it will be understood by those skilled in the art that the present application should not be limited to the described exemplary embodiments, and various changes and modifications can be made within the spirit and scope of the present application. For example, the vehicle control system according to the preferred embodiment may also be applied to a hybrid vehicle having an engine and a motor. In addition, the vehicle control system according to the preferred embodiment may also be applied to a vehicle in which a cruise control is available to control the driving force and the braking force automatically.

What is claimed is:

1. A vehicle control system that is configured to select an operating mode of a vehicle from a manual mode in which a driving force and a braking force are controlled manually by a driver and an autonomous mode in which the driving force and the braking force are controlled autonomously, comprising:
   a transmission connected to an engine, and
   a controller configured to:
   execute a fuel cut-off control, that stops a fuel supply to the engine while establishing an engine braking force, while controlling the engine;
   control the transmission to maintain a speed of the engine at a predetermined speed during execution of the fuel cut-off control;
   determine whether the selected operating mode of the vehicle is the manual mode or the autonomous mode;
   select a threshold for determining a termination of the fuel cut-off control based upon the selected operating mode; and
   determine whether a value meets the selected threshold,
   wherein the threshold selected is selected such that when the selected operating mode is the autonomous mode, the fuel cut-off control is terminated earlier than when the selected operating mode is the manual mode.

2. The vehicle control system as claimed in claim 1, wherein the value includes at least one of a vehicle speed and an engine speed, and
   wherein the controller is configured to select the threshold such than when the selected operating mode is the autonomous mode, the fuel-cut off control is terminated at a higher value than when the selected operating mode is the manual mode.

3. The vehicle control system as claimed in claim 1, wherein the transmission includes a geared transmission;
   wherein the value includes a gear stage of the geared transmission; and
   wherein the controller is configured to select the threshold such that when the selected operating mode is the autonomous mode, the fuel-cut off control is terminated at a higher gear stage than when the selected operating mode is the manual mode.

4. The vehicle control system as claimed in claim 1, wherein the value includes a speed ratio of the transmission; and
   wherein the controller is configured to select the threshold such that when the selected operating mode is the autonomous mode, the fuel-cut off control is terminated at a smaller speed ratio than when the selected operating mode is the manual mode.

5. The vehicle control system as claimed in claim 1, wherein the controller is configured to terminate the fuel cut-off control when the value meets the selected threshold.

* * * * *